US010338384B2

(12) United States Patent
Tremblay et al.

(10) Patent No.: US 10,338,384 B2
(45) Date of Patent: Jul. 2, 2019

(54) SPATIALLY SEPARATED EXIT PUPILS IN A HEAD MOUNTED DISPLAY

(71) Applicant: North Inc., Kitchener (CA)

(72) Inventors: Eric Tremblay, Saint Sulpice (CH); Mickael Guillaumee, Neucha-Tel (CH); David Ziegler, Lausanne (CH); Christophe Moser, Lausanne (CH); Lucio Kilcher, Montreux (CH)

(73) Assignee: North Inc., Kitchener, Ontario (CA)

( * ) Notice: Subject to any disclaimer, the term of this patent is extended or adjusted under 35 U.S.C. 154(b) by 58 days.

(21) Appl. No.: 14/977,420

(22) Filed: Dec. 21, 2015

(65) Prior Publication Data
US 2017/0102541 A1    Apr. 13, 2017

Related U.S. Application Data

(60) Provisional application No. 62/240,424, filed on Oct. 12, 2015.

(51) Int. Cl.
*G02B 27/01*    (2006.01)
*G02B 5/32*    (2006.01)
*G02B 27/00*    (2006.01)

(52) U.S. Cl.
CPC ........... *G02B 27/0103* (2013.01); *G02B 5/32* (2013.01); *G02B 27/0081* (2013.01); *G02B 27/0172* (2013.01); *G02B 2027/0154* (2013.01); *G02B 2027/0174* (2013.01); *G02B 2027/0178* (2013.01)

(58) Field of Classification Search
CPC .. G02B 27/0103; G02B 5/32; G02B 27/0081; G02B 27/0172; G02B 2027/0154; G02B 2027/0174; G02B 2027/0178
USPC .......................................................... 359/13
See application file for complete search history.

(56) References Cited

U.S. PATENT DOCUMENTS

| 2009/0244684 | A1 | 10/2009 | Gollier |
| 2010/0060551 | A1 | 3/2010 | Sugiyama et al. |
| 2012/0120499 | A1 | 5/2012 | Harrison et al. |
| 2012/0320100 | A1* | 12/2012 | Machida ............... G02B 27/017 345/690 |
| 2016/0033771 | A1* | 2/2016 | Tremblay ........... G02B 27/0172 345/8 |

FOREIGN PATENT DOCUMENTS

| JP | 2006209144 | | 8/2006 | |
| WO | WO 2014155288 | A2 * | 10/2014 | ......... G02B 27/0172 |

OTHER PUBLICATIONS

International Search Report and Written Opinion received for PCT Patent Application No. PCT/IB2016/002019, dated Aug. 24, 2017, 13 pages.

* cited by examiner

*Primary Examiner* — Wen Huang
(74) *Attorney, Agent, or Firm* — Cozen O'Connor

(57) ABSTRACT

Disclosed herein are devices and methods to provide multiple eyeboxes from multiple input pupils. In particular, a projection system can direct light from multiple input pupils to a holographic optical element. The light of each of the input pupils having light beams of different wavelengths. The holographic optical element reflects at least part of the light of the multiple input pupils to form an array of exit pupils.

9 Claims, 14 Drawing Sheets

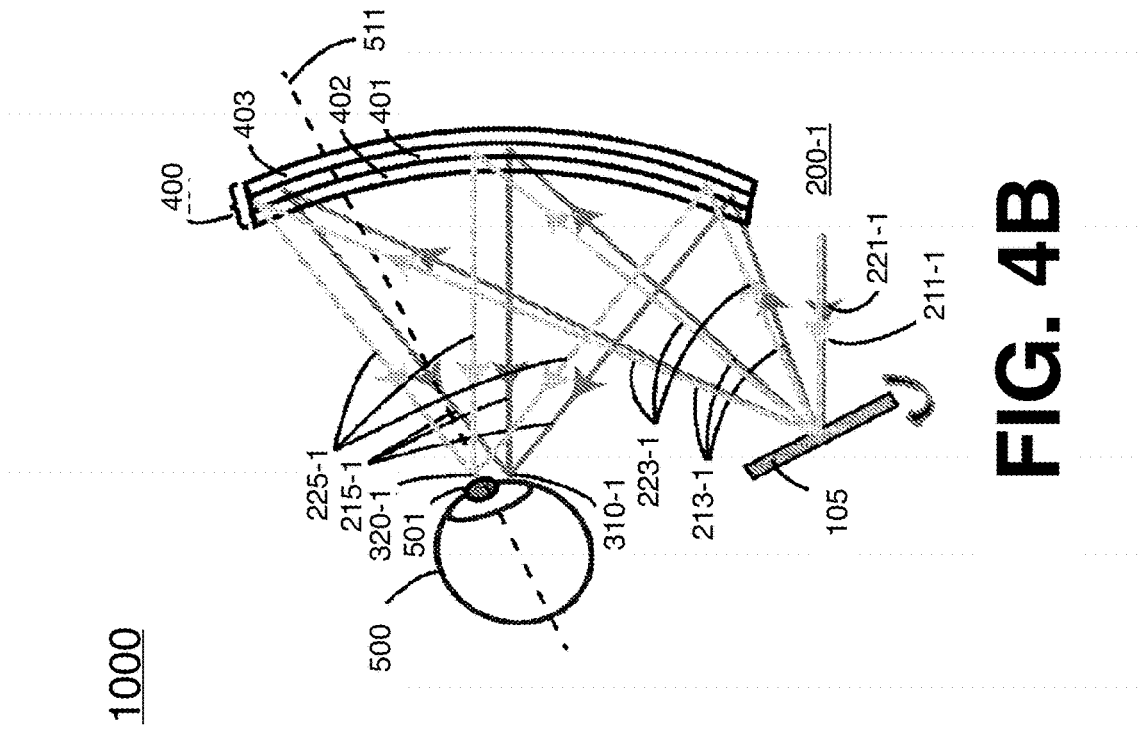
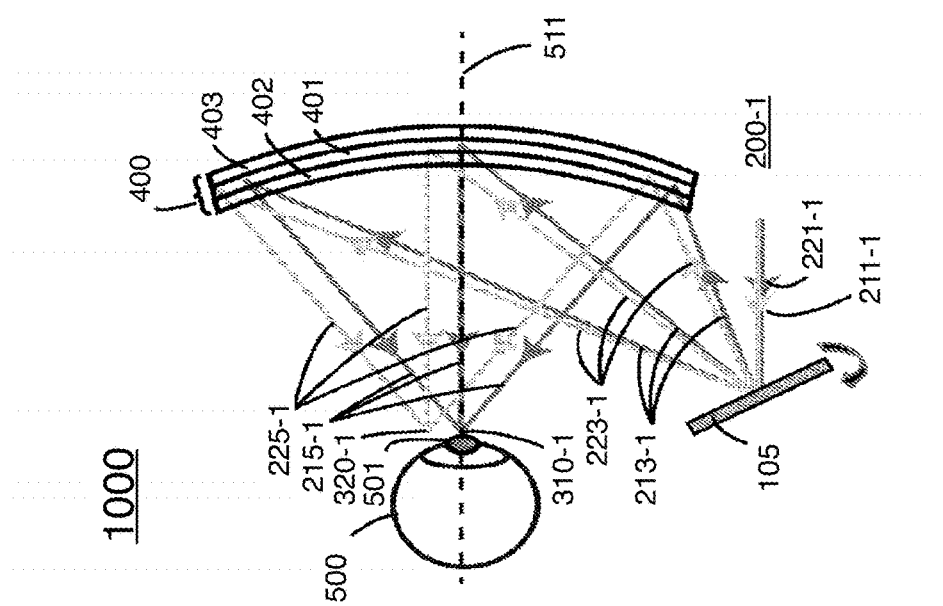
FIG. 4A
FIG. 4B

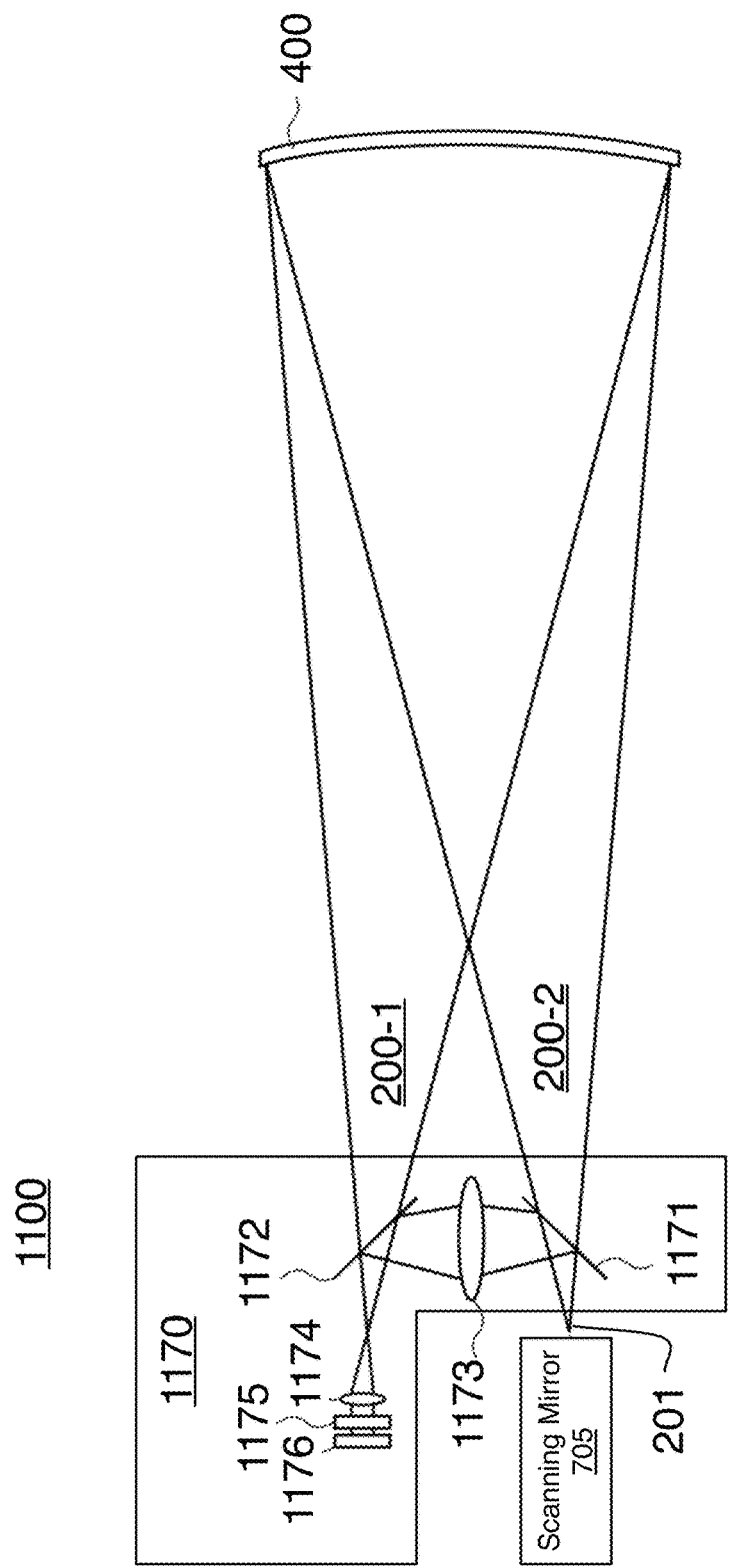

1300

```
┌─────────────────────────────────────────────────────────┐
│ Project a first group of light beams having multiple    │
│ wavelengths at a holographic optical element, the first │
│ group of light beams projected from a first input pupil.│
│                        1310                             │
└─────────────────────────────────────────────────────────┘
                            │
                            ▼
┌─────────────────────────────────────────────────────────┐
│ Project a second group of light beams having multiple   │
│ wavelengths at a holographic optical element, the second│
│ group of light beams projected from a second input      │
│ pupil, the second input pupil spatially separated from  │
│ the first input pupil.                                  │
│                        1320                             │
└─────────────────────────────────────────────────────────┘
                            │
                            ▼
┌─────────────────────────────────────────────────────────┐
│ Reflect the first and second group of light beams from  │
│ the holographic optical element, based at least in part │
│ on the wavelength of the light beams, to form multiple  │
│ sets of exit pupils.                                    │
│                        1330                             │
└─────────────────────────────────────────────────────────┘
```

FIG. 13

SPATIALLY SEPARATED EXIT PUPILS IN A HEAD MOUNTED DISPLAY

CROSS-REFERENCE TO RELATED APPLICATION

This application claims the benefit of U.S. Provisional Application Ser. No. 62/240,424 filed Oct. 12, 2015, entitled "Spatially Separated Exit Pupils in a Head Mounted Display," which application is incorporated herein by reference in its entirety

TECHNICAL FIELD

Embodiments herein generally relate to head worn displays and heads up displays. In particular, the present disclosure relates to multiple exit pupil head worn display systems.

BACKGROUND

Modern display technology may be implemented to provide head worn displays (HWD) and heads up displays (HUD). These displays may be implemented to provide a real world view (e.g., through the display) and/or a virtual view (e.g., images, text, or the like). Such display can be implemented in a variety of contexts, for example, defense, transportation, industrial, entertainment, wearable devices, or the like.

In particular, HWD and/or HUD displays may reflect projected light from a projection surface into a user's eye to provide a virtual image, which may be combined with a real world view. Conventionally, HWD and/or HUD systems have extremely difficult tradeoffs between various design and utility considerations, such as, for example, bulk, form-factor, see-through quality, field of view, etc. For example, a normal eyewear form factor, without bulk, has not been achieved in commercial head mounted displays. In particular, with HWD and/or HUD systems, the field of view where information can be overlaid is limited by the optical system eyebox. The eyebox is defined by the tolerances of the optical display system and limits the placement and movement of the wearer's eye. Conventionally, providing a field of view larger than approximately 20 degrees requires bulky optics or complex systems to enlarge the eyebox.

BRIEF DESCRIPTION OF THE DRAWINGS

FIGS. 4A-4B illustrate a portion of the example system in more detail.

FIGS. 6-9 and 11 illustrate example scanning optical systems.

FIG. 13 illustrates an example logic flow.

DETAILED DESCRIPTION

Figure 1:
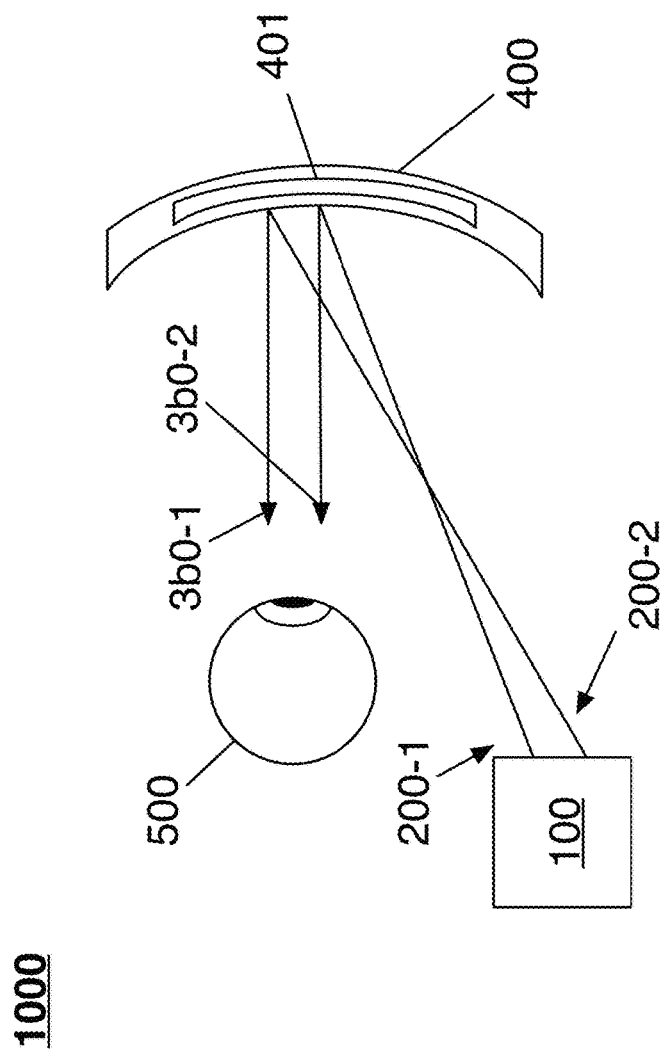
FIGS. 1-2 illustrates an example system.

Various implementations of the present disclosure are directed to heads up and/or head worn displays and specifically to providing multiple exit pupils for a virtual image to enlarge an eyebox. Said differently, a virtual image can be projected to multiple exit pupils proximate to a user's eye. The multiple exit pupils are spatially separated from each other to enlarge a viewing area (e.g., eyebox) for the virtual image.

In some examples, an optical system can be provided where light is directed at a holographic optical element from multiple entrance pupils, where each entrance pupil is spatially separated. Each entrance pupil can comprise light beams (or bundles of light beams) of different wavelengths. The light beams of each wavelength, from each entrance pupil, are reflected from the holographic optical element to a different exit pupil to project a virtual image at the exit pupils. These multiple exit pupils are spatially separated from each other proximate to a user's eye to enlarge a viewing area (e.g., eyebox) for the projected image.

With some examples, the multiple entrance pupils can be formed by splitting light emitted from a light source to direct the light to the holographic optical element from multiple entrance pupils. Said differently, the light can be directed to the holographic optical element from multiple different points in space, where each point is spatially separated from the others. In some examples, the entrance pupils are spatially separated in an out-of-plane direction of the holographic optical element. This is described in greater detail below. However, in general, holographic optical elements are selective in angular orientation of incident light. The location of each entrance pupil is selected to provide entrance pupils incident on the holographic optical element to create multiple exit pupils for each entrance pupil.

For example, two entrance pupils may be provided. The entrance pupils can be offset from each other in the out-of-plane direction of the holographic optical element. Additionally, light from each entrance pupil can be wavelength-multiplexed in the holographic optical element to create multiple sets of exit pupils. For example, if the light is wavelength-multiplexed to create two exit pupils, then a total of four exit pupils can be formed (e.g., two for each entrance pupil). Likewise, multiple sets of exit pupils can be formed by providing three, four, or more entrance pupils or by wavelength-multiplexing the light from each entrance pupil to two, three, four, or more exit pupils.

As used herein, an "entrance pupil" and an "exit pupil" are used in their broadest sense to refer to a spatial position or point where light enters and exits the system, respectively. Additionally, the present disclosure uses a number of example head word displays (HWD) to describe various implementations. However, this is not to be limiting and the present disclosure can be applied to other holographic optical element reflection type displays, such as, for example, a heads up display.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 2:
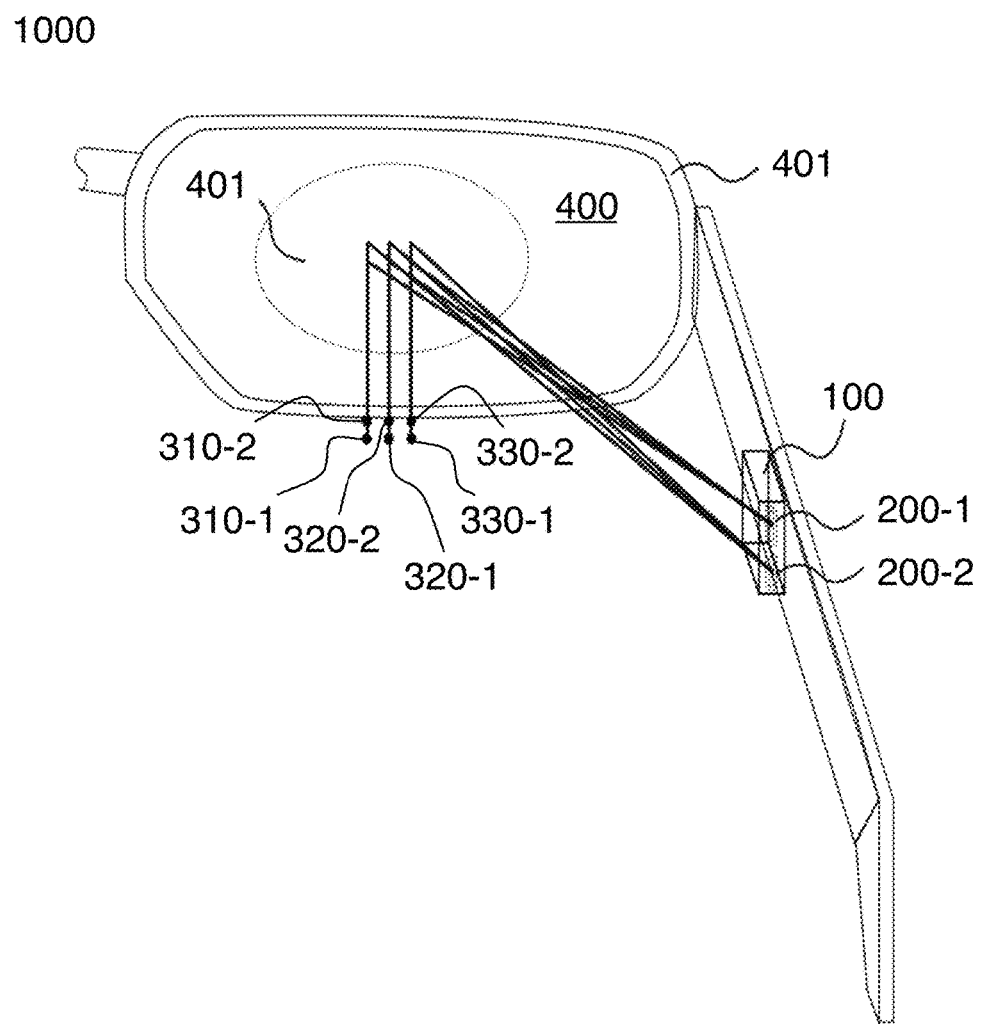

FIGS. 1-2 illustrate block diagrams of an optical system 1000 to provide multiple sets of exit pupils from multiple input pupils. It is noted, that FIG. 1 is a side view of the system 1000 while FIG. 2 is a perspective view of the system. Furthermore, it is noted that only the chief ray (described in greater detail below) is depicted in these figures for clarity of presentation.

In general, the system 1000 is configured to reflect light off a projection surface 400 to a user's eye 500. Said differently, the system 1000 projects a virtual image at exit pupils that are proximate to the user's eye 500 when a user is wearing and/or using the system 1000. In some implementations, the projection surface 400 is transparent, for example, to provide a real world view in conjunction with the projected virtual image. In some implementations, the projection surface 400 is opaque. In some implementations, the projection surface is partially transparent. It is noted, the projected virtual images can correspond to any information to be conveyed (e.g., text, images, or the like). Use of the term "virtual images" is not intended to be limiting to projection of images or pictures only. Furthermore, in some examples, the system 1000 can provide an augmented reality display where portions of the real world (e.g., either viewed through the display or projected) are augmented with virtual images. Examples are not limited in this context.

In general, the system 1000 is configured to create multiple sets of spatially separated exit pupils at the eye 500 of the user of the system 1000 (or location where the eye should be or would be if the system 1000 were worn or used). These sets of spatially separated exit pupils form an enlarged "synthetic" eyebox (refer to FIG. 3). As such, a larger field of view or larger projected image may be provided by the system 1000. In addition to providing a larger field of view, the enlarged eyebox may account for both person-to-person anthropometric differences in eye location, and the rotation of a user's eye as the user explores the projected image. It is noted, in some examples, the system 1000 can provide an enlarged field of view to provide a larger projected virtual image. In some examples, the system 1000 can provide an enlarged field of view to provide multiple copies of a projected virtual image such that a user can perceive the projected virtual image as the user rotates the eye.

The system 1000 may include a projection system 100 to project light to form multiple entrance pupils 200-$a$, where a is a positive integer greater than 2. For example, light beams corresponding to entrance pupils 200-1 and 200-2 are depicted. Each of the light beams corresponding to the entrance pupils 200-$a$ are wavelength-multiplexed to form multiple exit pupils 3$b$0-$a$ for each entrance pupil, where b is a positive integer greater than 2. As such, multiple sets of exit pupils are formed (e.g., one set for each entrance pupil 200-$a$).

More specifically, the projection system 100 can project light from multiple entrance pupils 200-$a$ to the projection surface 400. For example, the projection system can project light from entrance pupils 200-1 and 200-2 to the projection surface 400. Each entrance pupil 200-$a$ includes multiple light beams, each having a different wavelength. The projection surface 400 reflects these wavelength multiplexed light beams to a first set of exit pupils 3$b$0-$a$. For example, the projection surface 400 can reflect the light beams from the entrance pupil 200-1 to the set of exit pupils 3$b$0-1 and the light beams from the entrance pupil 200-2 to the set of exit pupils 3$b$0-2. In particular, as depicted in FIG. 2, the projection surface 400 reflects light from entrance pupil 200-1 to exit pupils 310-1, 320-1, and 330-1. Additionally, the projection surface 400 reflects light from entrance pupil 200-2 to exit pupils 310-2, 320-2, and 330-2.

In some implementations, each entrance pupil 200-$a$ can correspond to a number of wavelength multiplexed light beams in a range of wavelengths. More specifically, the projection system 100 can project an input beam (e.g., 200-1, 200-2, or the like) including multiple groups of light, each group having a wavelength similar in perceived color (e.g., $\lambda_1$, $\lambda_2$, and $\lambda_3$) to the projection surface 400. Furthermore, the projection system 100 directs these wavelength-multiplexed light to the projection surface 400 from multiple spatially separated points.

In general, the projection surface 400 includes a number of independent, multiplexed gratings (e.g., Bragg gratings, or the like) recorded in it. The projection surface can be referred to as a holographic optical element or a volume hologram. The projection surface 400 is wavelength selective, in that it reflects all (or at least part of) the light from a first wavelength (e.g., $\lambda_1$, first group of wavelengths, first range of wavelengths, or the like) to a first exit pupil location. The projection surface 400 reflects all (or at least part of) the light from a second wavelength (e.g., $\lambda_2$, second group of wavelengths, second range of wavelengths, or the like) to a second exit pupil location. The projection surface 400 reflects all (or at least part of) the light from a third wavelength (e.g., $\lambda_3$, third group of wavelengths, third range of wavelengths, or the like) to a third exit pupil location. These exit pupil locations are spatially separated from each other.

For example, FIG. 2 depicts columns of exit pupils 3$b$0-$a$. In particular, a first column of exit pupils, which may correspond to a first wavelength can include exit pupils 310-1 and 310-2. A second column of exit pupils, which may correspond to a second wavelength can include exit pupils 320-1 and 320-2. A third column of exit pupils, which may correspond to a third wavelength can include exit pupils 330-1 and 330-2. More detail regarding the light beams for each respective set of entrance pupils is given with respect to FIGS. 4A-4B and FIG. 5.

It is noted, that only the chief ray of the entrance and exit pupils are shown in FIGS. 1-2 and in FIG. 1, as the exit pupils for each input pupil are offset in the horizontal direction (or in-plane direction), they are not distinguished from each other. However, they are offset in the vertical (or out-of-plane direction). Accordingly, the 6 exit pupils 310-1, 310-2, 320-1, 320-2, 330-1, and 330-2 are depicted. In this example, the three wavelengths at which each input pupil are multiplexed act to spatially separate the exit pupils in the horizontal direction (3 across) with 3 multiplexed holograms 401 on the surface 400. The two entrance pupils 200-1 and 200-2 are used to create two rows of exit pupil. In particular, the leftmost column of the 3×2 exit pupil array would correspond to a single wavelength ($\lambda_1$) of light from two vertically offset sources. Similarly, for the middle column ($\lambda_2$ from two vertically offset sources) and right-most column ($\lambda_3$ from two vertically offset sources).

Each of the input pupils are angularly separated from each other. It is noted, that holographic optical elements can be selective in angle and wavelength, however this property depends heavily on the orientation. In particular, such holograms can be highly selective in the plane perpendicular to the gratings (e.g., the Bragg direction, or the like). However, such holograms may be much less selective in the orthogonal or "out-of-plane" direction. Accordingly, the multiple input pupils are offset in the vertical direction of FIGS. 1-2 while the grating of the surface 400 is setup in the horizontal direction. It is noted, that the grating (e.g., refer to FIG. 4A-4B) may be configured to wavelength multiplex the light either vertically or horizontally. As such, the input pupils may be either horizontally or vertically separated. It is worthy to note, the chief ray of the exit pupils 310-$b$ corresponding to one entrance pupil 200-1 may not need to be aligned in a "line" as depicted in FIGS. 1-2. Examples are not limited in this respect.

The projection system 100 projects light onto the projection surface 400 from the entrance pupils 200-$a$. In particular, the projection system 100 projects the light onto a portion of the projection surface 400 that includes the holographic optical element 401. The holographic optical element 401 reflects the incident light to multiple exit pupils 3$b$0-$a$ to (or into) a user's eye 500 so a virtual image can be perceived by the user.

Figure 3:
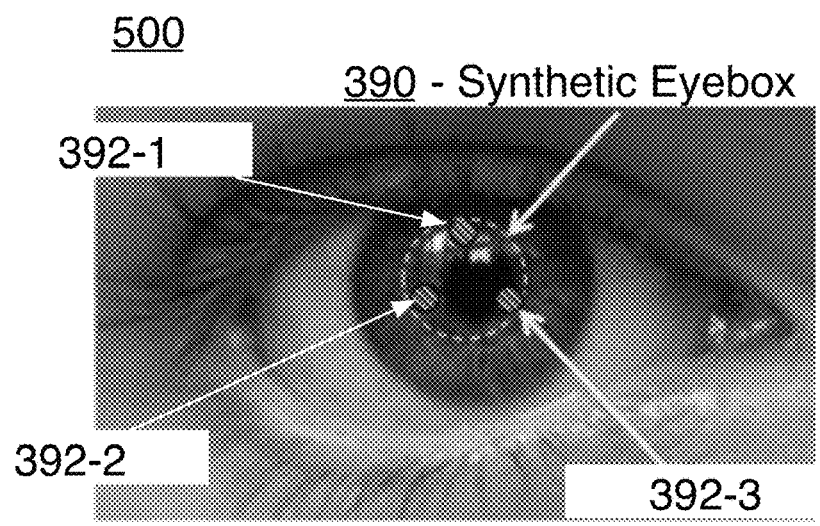
FIG. 3 illustrates an example synthetic eyebox.

For example, referring to FIG. 3, an eye 500 and a synthetic eyebox 390 are illustrated. The synthetic eyebox 390 includes multiple spatially separated eyeboxes 392-$a$ projected to (or into, or onto) the eye 500 to form the synthetic eyebox 390. For example, eyeboxes 392-1, 392-2, and 392-3 are depicted. With some examples, the individual eyeboxes 392-$a$ may correspond to a set of exit pupils 3$b$0-$a$. For example, the eyebox 392-1 may correspond to the exit pupils 310-$a$, the eyebox 392-2 may correspond to the exit pupils 320-$a$, and the eyebox 392-3 may correspond to the exit pupils 330-$a$. As another example, the eyebox 392-1 may correspond to the exit pupils 3$b$0-1, the eyebox 392-2 may correspond to the exit pupils 3$b$0-2, etc.

It is noted, that the sets of exit pupils are to be created in the out of plane direction of the holographic optical element 401, which is these figures is vertical. Accordingly, FIG. 1 does not individually identify the exit pupils of each set. In particular, as depicted in FIG. 2, the entrance pupils are angularly separated to create multiple sets of exit pupils, in the out of plane direction of the hologram. More specifically, the entrance pupil 200-1 may be projected and wavelength-multiplexed to form a first set of exit pupils 310-1, 320-1, and 330-1 while the entrance pupil 200-2 may be projected and wavelength-multiplexed to form a second set of exit pupils 310-2, 320-2, and 330-2.

Examples of the projection system 100 are given in greater detail below. However, in general, the projection system 100 can receive a beam of light from a laser or may include a laser to generate light beams having different wavelengths. The projection system 100 can include a micro-electro-mechanical system (MEMS) mirror to scan and/or direct the light across the projection surface 400 from multiple viewpoints (e.g., entrance pupils).

With some examples, the projection surface 400 may be a volume holographic transflector. As noted, the projection surface 400 may reflect the light projected by the system 100 into the eye 500 to provide a virtual image in the synthetic eyebox. Additionally, the projection surface 400 can simultaneously allow light from outside the system 1000 (e.g., real world light, etc.) to be transmitted through the projection surface 400 to provide for a real world view in addition to a virtual view.

In general, the system 1000 may be implemented in any heads up and/or head worn display. With some examples, the projection surface 400 may be implemented in a wearable device, such as for example, glasses 401. Although glasses are depicted, the system 1000 can be implemented in a helmet, visor, windshield, or other type of HUD/HWD display.

Furthermore, additional sets of exit pupils can be created, for example, 3 entrance pupils each multiplexed with three wavelengths may form 9 exit pupils in a 3×3 array. Examples are not limited in this context.

Figure 5:
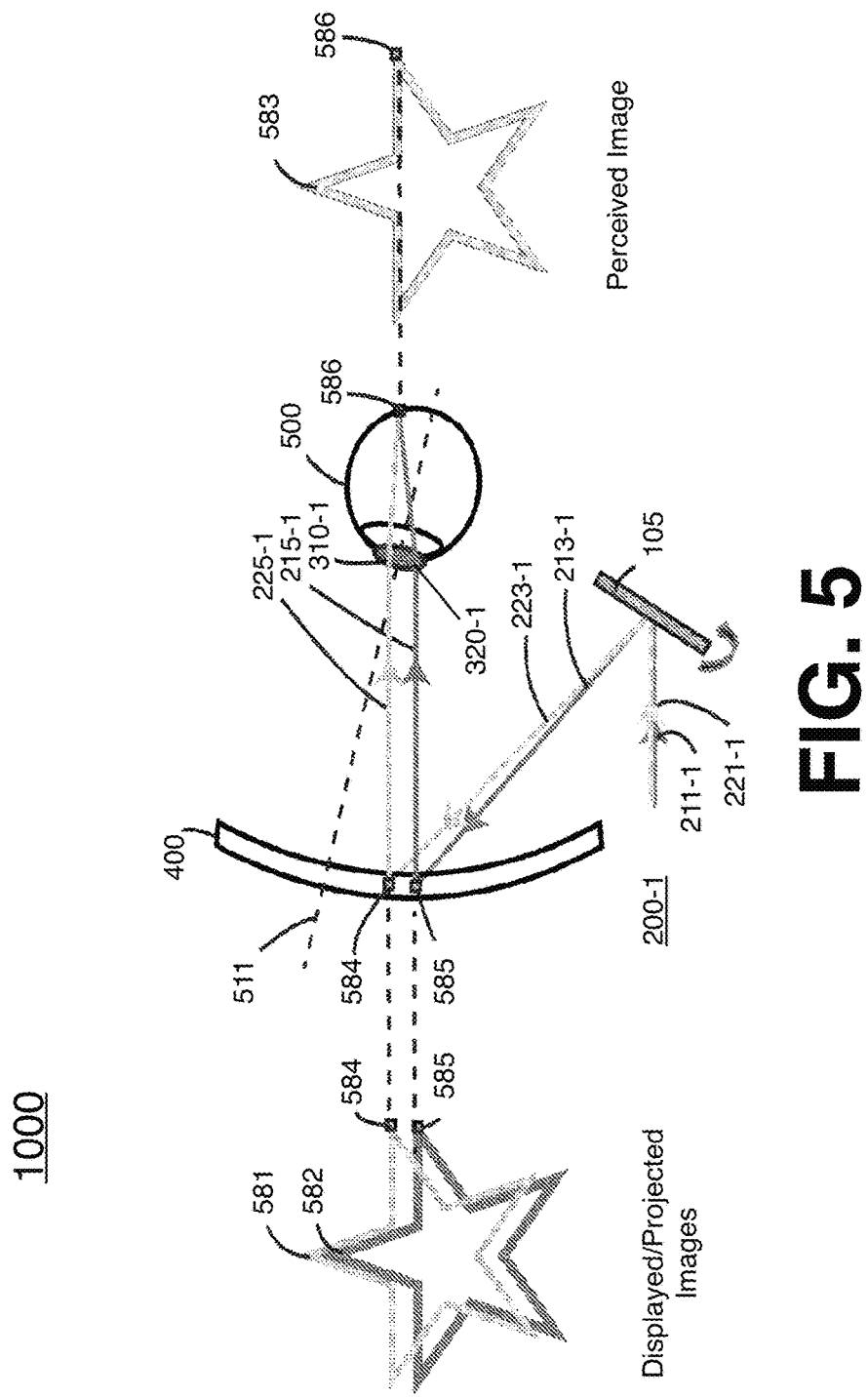
FIG. 5 illustrates a portion of the example system in more detail.

FIGS. 4A-4B and 5 depict examples of multiple exit pupils formed from a single input pupil. It is noted, that these figures depict only a single input pupil for convenience and clarity of presentation. However, as discussed above with respect to FIGS. 1-3, the present disclosure can be implemented to provide an array of exit pupils formed from multiple input pupils.

FIGS. 4A-4B show an example of multiple exit pupils corresponding to a single input pupil. As noted above, the present disclose provides for multiple exit pupils to be formed from a singled input pupil. For example, the system 1000 can form the exit pupils 310-1, 320-1, and 330-1 from the input pupil 200-1. More specifically, each input pupil is wavelength multiplexed to form multiple spatially separated exit pupils. It is noted, FIGS. 4A-4B depict two (2) exit pupils for convenience and clarity. However, as shown above, more than two (2) (e.g., three (3) are depicted in FIGS. 1-3) can be formed. It is also noted, holographic optical elements exhibit "selectivity." Said differently, the holographic optical element includes features (e.g., reflective portions, or the like) for one wavelength of light and angle of incidence that are independent from features for another sufficiently different wavelength and incidence angle. In this way, sources of different center wavelength or incidence angle can be used to produce multiple independent exit pupils without crosstalk, thus producing an enlarged effective eyebox.

Further, the multiple exit pupils can be created from wavelengths of similar color in terms of human perception. For example, several exit pupil locations can be created using several different red light sources with sufficiently different center wavelengths. The required separation depends on the spectral selectivity of the surface 400 to prevent crosstalk. The surface 400 can include a recorded holographic optical element 401 disposed between protective layers 402 and 403.

Turning more particularly to FIG. 4A, a schematic of an optical arrangement of two exit pupils 310-1 and 320-1 is depicted. It is noted, that the exit pupils 310-1 and 320-1 are depicted as spatially separated in a vertical direction. It is noted, the exit pupils 310-1 and 320-1 are depicted in the vertical axis (as opposed to the horizontal axis depicted in FIG. 2) for purposes of convenience and clarity. Examples are not limited in this context. The exit pupils 310-1 and 320-1 are created by multiplexing light beams of different wavelengths originating from a single input pupil. More particularly, light beams (or bundles of light beams) 211-1 and 221-1 originate from input pupil 200-1. The light beam 211-1 has a first wavelength of light while the light beam 221-1 has a second wavelength of light, different than the first wavelength. These light beams are reflected by the scanning mirror 105. The scanning mirror 105 scans (or projects) the light beams in angles as projected light beams 213-1 and 223-1, respectively. In some examples, the scanning mirror 105 modulates the intensity of the reflected light beams to correspond to a digital image.

The holographic optical element 401 of the projection surface 400 reflects the projected light beams 213-1 and 223-1 into diffracted light beams 215-1 and 225-1. In particular, the holographic optical element 401 reflects the projected light beams 213-1 and 223-1 towards the two exit pupil locations 310-1 and 320-1 at the plane of the eye 500. As depicted, the eye 500 (having eye pupil 501) has a line of sight 511 that is aligned to the center of the exit pupil 310-1. Accordingly, a user (e.g., corresponding to the eye 500, or the like) can perceive an image at the exit pupil 310-1.

However, the system 1000 includes multiple exit pupils, which can provide a tolerance to eye rotation. Turning more particularly to FIG. 4B, a schematic of the optical arrangement of the two exit pupils depicted in FIG. 4A is shown with the eye 500 rotated. In particular, the eye pupil 501 and consequently the line of sight 511 of the eye 500 has shifted vertically to be aligned with exit pupil 320-1. As such, a user can perceive an image at exit pupil 320-1.

When multiple exit pupils are created, light from a particular position of the scanning mirror 105 can be projected to a retina of the eye 500. In particular, light from different positions of the scanning mirror, which may correspond to a pixel of an image to be projected, can appear on the retina of the eye 500. As such, irrespective of the eye rotation, a user may perceive the projected image. More particularly, the scanning mirror 105 can reflect wavelength multiplexed light corresponding to an image to be projected from a single input pupil. The holographic optical element 401 reflects this wavelength multiplexed light to multiple exit pupils. However, light from these multiple exit pupils can be reflected to a user's retina such that, irrespective of the user's eye rotation, the user can perceive the projected image.

For example, FIG. 5 depicts the scanning mirror 105 reflecting light beams 211-1 and 221-1 from input pupil 200-1. The light beams 211-1 and 221-1 can have different wavelengths as described above. The scanning mirror 105 reflects the light beams 211-1 and 221-1 to the projection surface 400, which includes a holographic optical element to reflect the light beams to different exit pupils. The scanning mirror 105 (or other component of the projection system 100) can module the light beams 211-1 and 221-1 to correspond to images 581 and 581. By projecting images 581 and 582 shifted from each other as depicted, a single apparent image 583 can be produced on the retina of the eye 500. More specifically, a single image can be perceived by a user.

In particular, the pixels 584 and 585 contain the information of the same image pixel for each exit pupil 310-1 and 320-1. By projecting pixels 584 and 585 on the projection surface with a separation distance similar to the separation distance of the exit pupils 310-1 and 320-1, pixels 584 and 585 are reflected by the projection surface 400 as diffracted light beams 215-1 and 225-1 to exit pupils 310-1 and 320-1, respectively. Additionally, the pixels 584 and 585 merge into one single pixel 586 on the retina of the eye 500 so the images 581 and 582 are perceived as a single image 583. This is true even when the eye 500 is rotated so the line of sight 511 is shifted.

In some examples, the light beams 211-1 and 221-1 are modulated based on image processing techniques to laterally shift the projected images for each of the different wavelength sources. Additional geometric corrections may be applied, for example, to correct for distortion. The present disclosure may provide systems having additional shifts across 2-dimensions. Furthermore, additional pre-processing of the images to correct nonlinearities (e.g., distortion, or the like) to improve alignment of the images may be implemented.

FIGS. 6-11, depict example scanning mirror systems, each implemented according to the present disclosure. Each of these systems can be implemented to provide multiple input pupils as described herein. These examples provide that the chief rays incident on the hologram appear, from the perspective of the hologram, to come from different vertical or horizontal positions on the arm of the eyewear. However, for alternatively biased gratings, the systems can be configured to provide chief rays that are offset in the horizontal direction.

Figure 6:
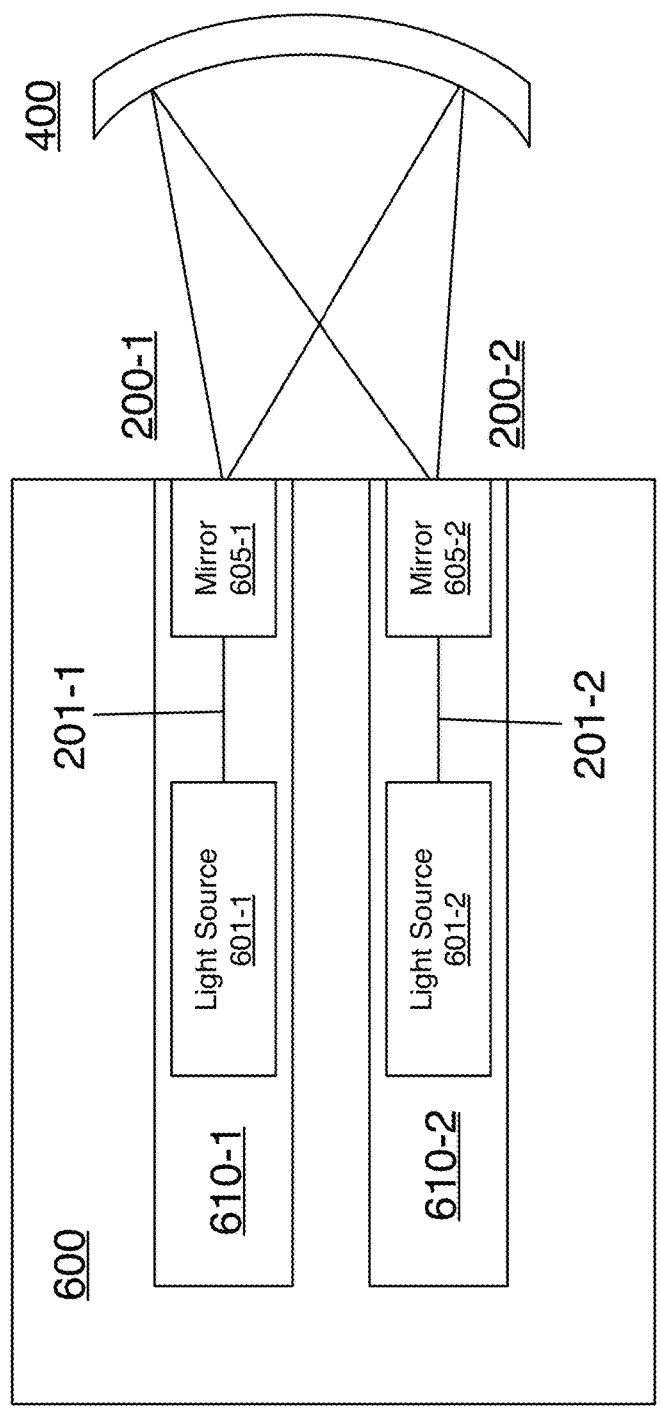

Turning more specifically to FIG. 6, a projection system 600 is depicted. The projection system 600 can be implemented as the projection system 100 of the system 1000. The projection system 600 includes multiple independent sub-projection systems 610-*a*, where "a" is a positive integer greater than 2. For example, systems 610-1 and 610-2 are depicted. Each of the projection systems 610-1 and 610-2 can include a light source to emit beams of light having different wavelengths. For example, light sources 601-1 and 601-2 are depicted. Each light source emits light 201 (e.g., 201-1, 201-2, etc.) In some examples, the light sources 601-1 and 601-2 can include laser light sources, light emitting diode (LED) light sources, or the like. Additionally, each of the projection systems 610-1 and 610-2 can include a scanning mirror to reflect light from the respective light source (e.g., light 201-1, 201-2, etc.) to the projection surface 400. For example, scanning mirrors 605-1 and 605-2 are depicted. In some examples, the scanning mirrors 605-1 and 605-2 can include micro electromechanical systems (MEMS) including reflectors or mirrors to reflect and module the light (e.g., light 201-1, 201-2, etc.)

The sub-projection systems 610-1 and 610-2 are arranged to each project multiple light beams having different wavelengths from spatially separated entrance pupils 200-1 and 200-2, respectively. It is noted, that the sub-projection systems 610-1 and 610-2 are arranged such that the entrance pupils 200-1 and 200-2 are spatially separated from each other in the out-of-plane direction of the projection surface 400. More specifically, the entrance pupils 200-1 and 200-2 are spatially separated from each other in the out-of-plane direction of the holographic optical element of the projection surface 400.

Figure 7:
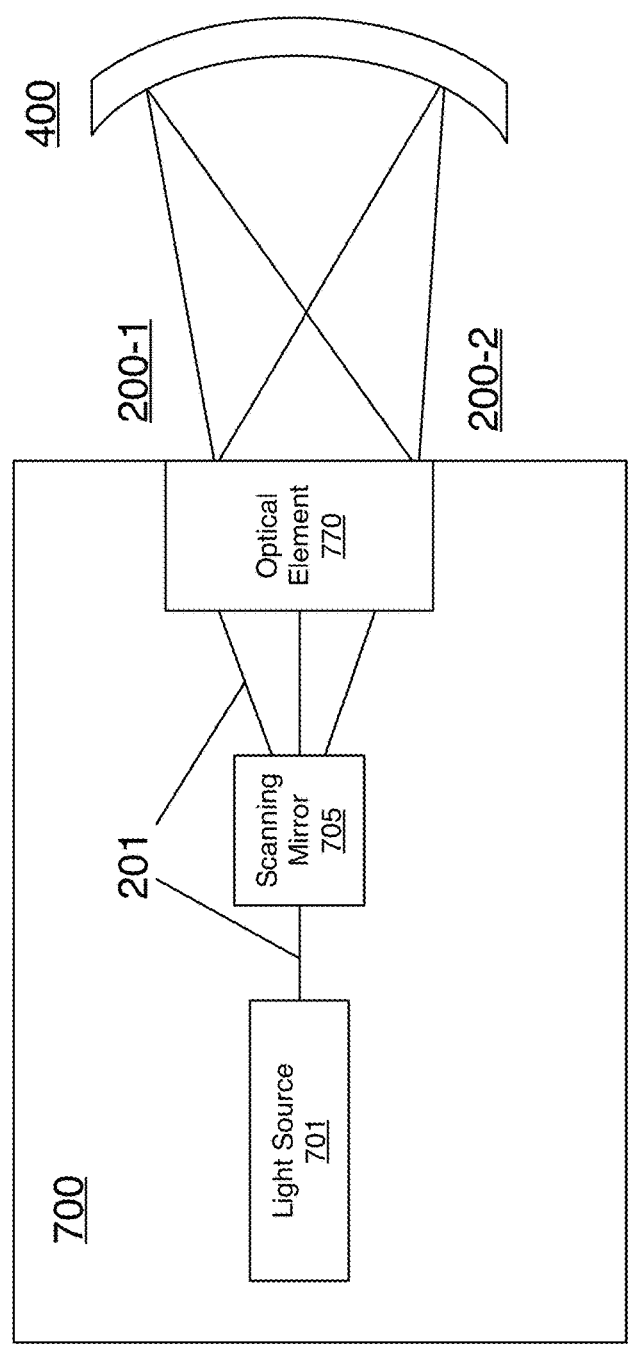

Turning more specifically to FIG. 7, a projection system 700 is depicted. The projection system 700 can be implemented as the projection system 100 of the system 1000. The projection system 700 includes a light source 701, a scanning mirror 705, and an optical element 770. In general, the light source emits light 201 having multiple light beams of different wavelengths. The light 201 is received by the scanning mirror 705. The scanning mirror 705 projects the light 201 into the optical element 770, which directs (e.g., reflects, diffracts, folds, and/or the like) the light 201 to to the projection surface 400 from multiple entrance pupils. For example, the optical element 770 directs the light 201 to the projection surface 400 from entrance pupils 200-1 and 200-2.

Figure 8:
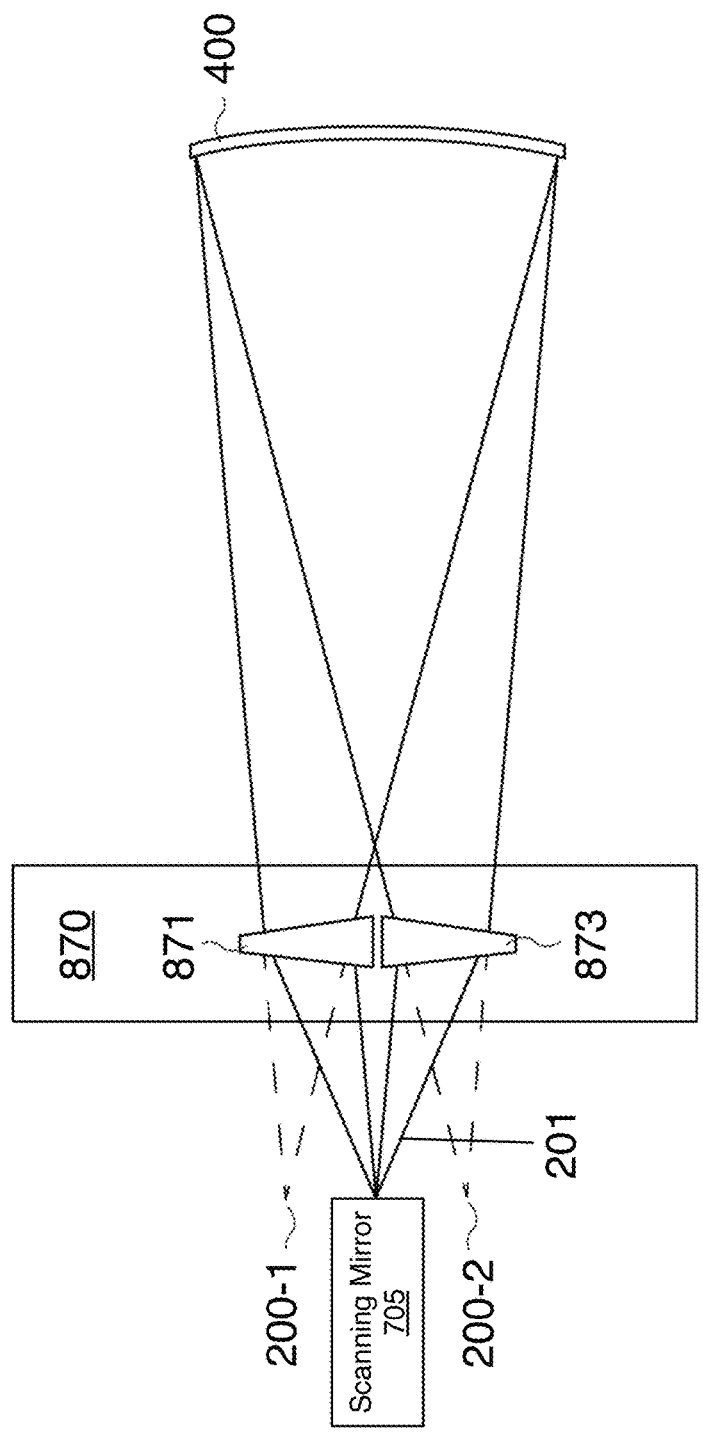

Turning more specifically to FIG. 8, an optical element 870 is depicted. The optical element 870 can be implemented as the optical element 770 of the projection system 700. The optical element 870 includes prisms 871 and 873. The prisms 871 and 873 receive the light (e.g., light 201) projected by the scanning mirror 705 and direct the light to the projection surface 400 from the perspective of multiple input pupil locations. In particular, the prism 871 directs the light 201 to the projection surface such that the light 201 appears to originate from entrance pupil 200-1. Similarly, the prism 873 directs the light 201 to the projection surface such that the light 201 appears to originate from entrance pupil 200-2.

Figure 9:
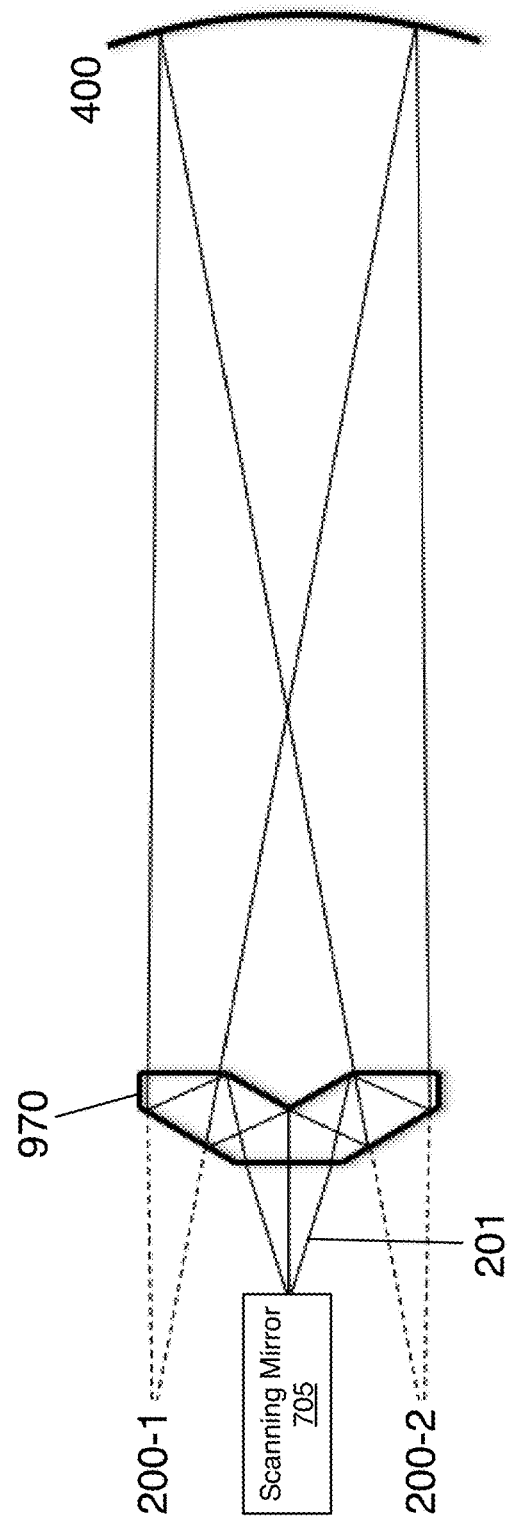

Turning more specifically to FIG. 9, an optical element 970 is depicted. The optical element 970 can be implemented as the optical element 770 of the projection system 700. In some examples, the optical element 970 may be implemented as a fold mirror. The optical element 970 receive the light (e.g., light 201) projected by the scanning mirror 705 and direct the light to the projection surface 400 from the perspective of multiple input pupil locations. In particular, the optical element folds and redirects the light 201 to the projection surface such that the light 201 appears to originate from entrance pupils 200-1 and 200-2.

Figure 10:
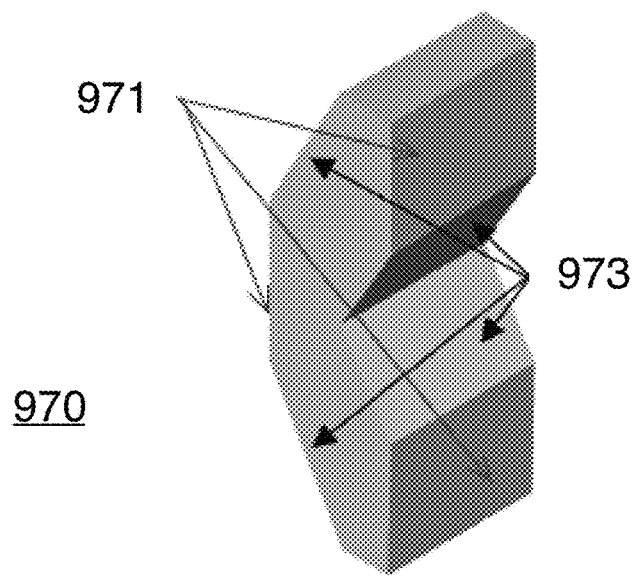
FIG. 10 illustrates an example optical element.

Turning more specifically to FIG. 10, a perspective view of the optical element 970 is depicted. As depicted, the optical element comprises refractive surfaces 971 to refract incident light and reflective surfaces 973 to reflect incident light. Accordingly, during operation, as depicted in FIG. 9, the optical element 970 can refract and reflect light 201 through the element 970 to direct the light 201 to the projection surface 400 from multiple entrance pupils (e.g., 200-1 and 200-2).

Turning more specifically to FIG. 11, an optical element 1170 is depicted. The optical element 1170 can be implemented as the optical element 770 of the projection system 700. The optical element 1170 includes one or more of a first beam splitter 1171 and a second beam splitter 1172, a first lens 1173 and a second lens 1174, a wave plate 1175, and a mirror 1176.

During operation, light 201 is projected from the scanning mirror 705 to the beam splitter 1171. The beam splitter 1171 splits the light 201. In particular, light is directed from the beam splitter 1171 to the projection surface from entrance pupil 200-2 and also directed to the first lens 1173. In some examples, light 201 is polarized and/or orthogonally polarized based on a desired entrance pupil location. The first lens 1173 reimages the light 201 and transmits the light 201 to the second beam splitter 1172. The second beam splitter 1172 reflects the light to the second lens 1174. The second lens 1174 can collimate the light 201 and transmit the collimated light 201 to the wave plate 1175. The quarter wave plate 1175 rotates the light 201 and transmits the rotated light to the mirror 1176. The mirror 1176 reflects the rotated light back to the quarter wave plate 1175. The quarter wave plate 1175 again rotates the light 201 and transmits the rotated light to the second lens 1174. The second lens 1174 focuses the lights and transmits the light to the second beam splitter 1172. The second beam splitter 1172 directs the lights to the projection surface 400 from the entrance pupil 200-1.

Figure 12:
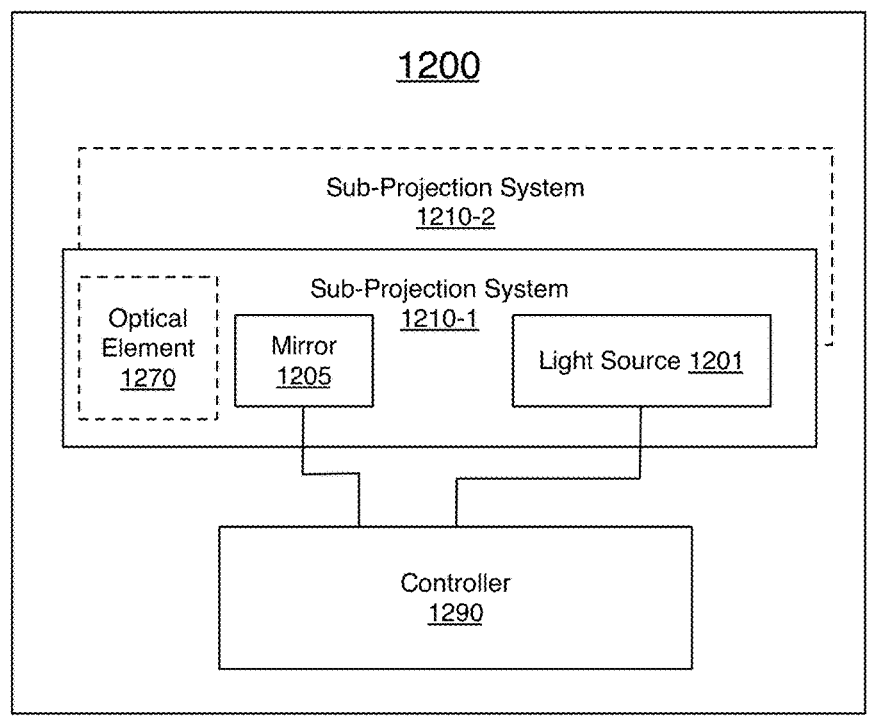
FIG. 12 illustrates an example optical system.

FIG. 12 illustrates a block diagram of an example projection system 1200. The projection system 1200 can be implemented as the projection system 100 of the system 1000. In general, the projection system 1200 may be implemented to provide multiple input pupils where each input pupil is wavelength multiplexed to create an array of exit pupils. Said differently, the projection system 1200 can be implemented to project light at a projection surface from multiple input pupils to form a set of exit pupils for each of the multiple input pupils.

The system 1200 may include at least one sub-projection system 1210-*a*, where "a" is a positive integer. For example, sub-projection system 1210-1 and sub-projection system 1210-2 are depicted. Each of the sub-projection systems 1210-*a* may be provided to provide one or more input pupils that are wavelength multiplexed resulting in a set of exit pupils for each input pupil. Each of the sub-projection systems 1210-*a* may include a light source 1201 (e.g., a laser, an LED, or the like). Additionally, the sub-projection systems 1210-*a* can include a scanning mirror 1205. The scanning mirror 1205 may be a MEMS based mirror configured to rotate about a number of axes to project light emitted from the light source 1201 across a projection surface (e.g., the surface 400, or the like). Additionally, and particularly where a single sub-projection system 1210-*a* is provided, the sub-projection system 1210-*a* can include an optical element 1270. In some examples, the optical element 1270 as described with respect to FIGS. 7-10. In general, the optical element 1270 can direct light from the light source 1201 and scanning mirror 1205 to a projection surface from multiple entrance pupils.

The system 1200 can also include a controller 1290. In general, the controller 1290 may comprise logic, at least a portion of which is implemented in hardware, to control the sub-projection systems 1210-*a*. The controller may comprise specially configured logic (e.g., gates, application specific integrated circuits (ASICS), field programmable gate arrays (FPGAS), microcontrollers and associated instructions executable by the microcontroller, or the like. The controller 1290 can send control signals to the scanning mirror 1205 to cause the scanning mirror 1205 to rotate about a number of axes to project light into the optical element 1270 and/or onto a projection surface (e.g., the surface 400, or the like).

FIG. 13 depicts a logic flow 1300 for projecting a virtual image. The logic flow 1300 may begin at block 1310. At block 1310 "project a first group of light beams having multiple wavelengths at a holographic optical element, the first group of light beams projected from a first input pupil," the scanning mirror (e.g., 105, 605-1, 705, 1205, or the like) projects light (e.g., light 201) having multiple wavelengths to a projection surface having a holographic optical element. In particular, the scanning mirror projects the light to the projection surface from a second entrance pupil location. For example, the scanning mirror 105 can project the light 201 from the second entrance pupil 200-2, which is spatially separated from the first entrance pupil 200-1. In particular, the first and second entrance pupils 200-1 and 200-2 are spatially separated from each other in the out-of-plane direction of the holographic optical element 401.

Continuing to block 1320 "reflect the first and second group of light beams from the holographic optical element, based at least in part on the wavelength of the light beams, to form multiple sets of exit pupil," the holographic optical element 401 reflects the light beams from each entrance pupil to form an array of exit pupils. Said differently, the holographic optical element reflects the light beams from each entrance pupil to form a set of multiple exit pupils for each entrance pupil. For example, the holographic optical element 401 can reflect light 201 from entrance pupil 200-1 to form a set of exit pupils including exit pupils 310-1, 320-1, and 330-1. Additionally, the holographic optical element 401 can reflect light 201 from entrance pupil 200-2 to form a set of exit pupils including exit pupils 310-2, 320-2, and 330-2.

Figure 14:
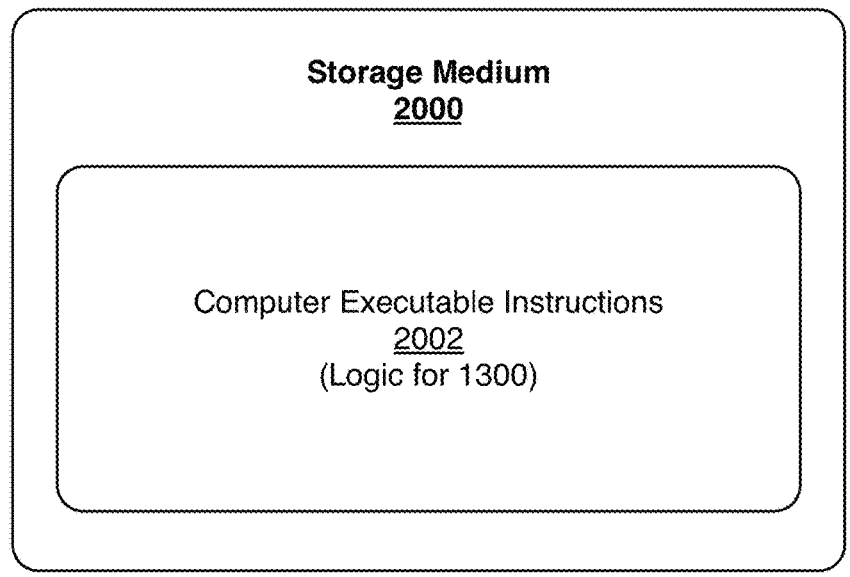
FIG. 14 illustrates an example computer readable medium.

FIG. 14 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
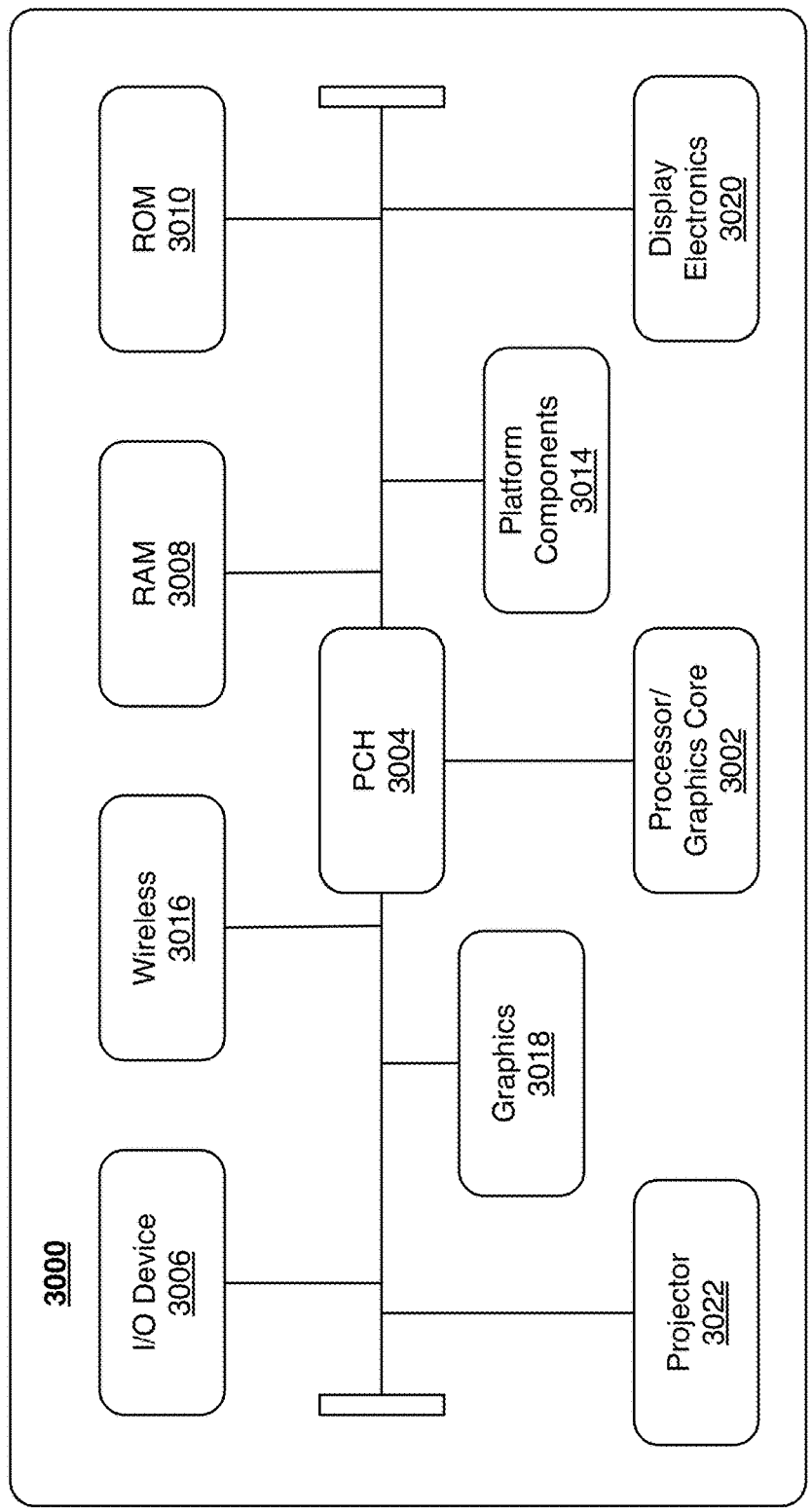
FIG. 15 illustrates an example device.

FIG. 15 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020, projector 3022 (e.g., system 1000, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus, comprising: a projection system to project light from a plurality of entrance pupils, each of the plurality of entrance pupils comprising a plurality of light beams, a wavelength of at least one of the plurality of light beams different from a wavelength of at least one other of the plurality of light beams; and a holographic optical element in optical communication with the projection system, the holographic optical element to receive the light from the plurality of entrance pupils and reflect at least a portion of the light to a plurality of exit pupils.

Example 2

The apparatus of example 1, at least one of the plurality of entrance pupils spatially separated from at least one other of the plurality of entrance pupils in an out of plane direction of the holographic optical element.

Example 3

The apparatus of example 1, wherein each of the plurality of entrance pupils comprises a first light beam having a first wavelength, a second light beam having a second wavelength, and a third light beam having a third wavelength, wherein the first wavelength is different from the second wavelength and the first and second wavelength is different from the third wavelength.

Example 4

The apparatus of example 3, wherein the plurality of exit pupils comprises a first set of exit pupils corresponding to the first light beams having the first wavelength, a second set of exit pupils corresponding to the second light beams having the second wavelength, and a third set of exit pupils corresponding to the third light beams having the third wavelength.

Example 5

The apparatus of example 4, wherein the plurality of exit pupils comprises a spatially separated exit pupil for each light beam of the plurality of entrance pupils having a different wavelength.

Example 6

The apparatus of any one of examples 1 to 5, the projection system comprising: at least one light source to emit the plurality of light beams; and at least one micro-mirror device in optical communication with the at least one light source, the micro-mirror device to receive the plurality of light beams and direct the plurality of light beams to the holographic optical element from the plurality of entrance pupils.

Example 7

The apparatus of example 6, wherein the at least one light source comprises a plurality of light, each of the plurality of light sources to emit a one of the plurality of light beams.

Example 8

The apparatus of example 6, the at least one micro-mirror comprises a micro-electromechanical system (MEMS) mirror.

Example 9

The apparatus of example 6, the projection system comprising an optical element in optical communication with the mirror, the mirror to project light onto the optical element and the optical element to direct the projected light to the holographic optical element from the plurality of entrance pupils.

Example 10

The apparatus of example 9, wherein the optical element comprises at least one of a prism, a fold mirror, a beam splitter, a lens, or a wave plate.

Example 11

A system, comprising: a frame; a projection surface operably coupled to the frame, the projection surface comprising a holographic optical element; and a projection system operably coupled to the frame, the projection system to project light from a plurality of entrance pupils to the projection surface, each of the plurality of entrance pupils comprising a plurality of light beams, a wavelength of at least one of the plurality of light beams different from a wavelength of at least one other of the plurality of light beams, the holographic optical element to receive the light from the plurality of entrance pupils and reflect at least a portion of the light to a plurality of exit pupils.

Example 12

The system of example 11, wherein the frame is a glasses frame, a helmet frame, or a windshield frame.

Example 13

The system of example 12, wherein the projection surface is a glasses lens, a helmet visor, or a windshield.

Example 14

The system of example 11, at least one of the plurality of entrance pupils spatially separated from at least one other of the plurality of entrance pupils in an out of plane direction of the holographic optical element.

Example 15

The system of example 11, wherein each of the plurality of entrance pupils comprises a first light beam having a first wavelength, a second light beam having a second wavelength, and a third light beam having a third wavelength, wherein the first wavelength is different from the second wavelength and the first and second wavelengths are different from the third wavelength.

Example 16

The system of example 15, wherein the plurality of exit pupils comprises a first set of exit pupils corresponding to the first light beams having the first wavelength, a second set of exit pupils corresponding to the second light beams having the second wavelength, and a third set of exit pupils corresponding to the third light beams having the third wavelength.

Example 17

The system of example 16, wherein the plurality of exit pupils comprises a spatially separated exit pupil for each light beam of the plurality of entrance pupils having a different wavelength.

Example 18

The system of example 11, the projection system comprising: at least one light source to emit the plurality of light beams; and at least one mirror in optical communication with the at least one light source, the mirror to receive the plurality of light beams and direct the plurality of light beams to the holographic optical element from the plurality of entrance pupils.

Example 19

The system of example 18, wherein the at least one light source comprises a plurality of light sources, each of the plurality of light sources to emit a one of the plurality of light beams.

Example 20

The system of example 18, the at least one mirror comprises a micro-electromechanical system (MEMS) mirror.

Example 21

The system of example 18, the projection system comprising an optical element in optical communication with the mirror, the mirror to project light onto the optical element and the optical element to direct the projected light to the holographic optical element from the plurality of entrance pupils.

Example 22

The system of example 21, wherein the optical element comprises at least one of a prism, a fold mirror, a beam splitter, a lens, or a wave plate.

Example 23

The system of example 11, comprising a battery electrically coupled to the projection system.

Example 24

A method comprising: projecting light from a plurality of entrance pupils, each of the plurality of entrance pupils comprising a plurality of light beams, a wavelength of at least one of the plurality of light beams different from a wavelength of at least one other of the plurality of light beams; and reflecting at a holographic optical element, at least a portion of the light to a plurality of exit pupils.

Example 25

The method of example 24, at least one of the plurality of entrance pupils spatially separated from at least one other of the plurality of entrance pupils in an out of plane direction of the holographic optical element.

Example 26

The method of example 25, wherein each of the plurality of entrance pupils comprises a first light beam having a first wavelength, a second light beam having a second wavelength, and a third light beam having a third wavelength, wherein the first wavelength is different from the second wavelength and the first and second wavelengths are different from the third wavelength.

Example 27

The method of example 26, wherein the plurality of exit pupils comprises a first set of exit pupils corresponding to the first light beams having the first wavelength, a second set of exit pupils corresponding to the second light beams having the second wavelength, and a third set of exit pupils corresponding to the third light beams having the third wavelength.

Example 28

The method of example 27, wherein the plurality of exit pupils comprises a spatially separated exit pupil for each light beam of the plurality of entrance pupils having a different wavelength.

Example 29

The method of example 26, comprising: emitting the plurality of light beams from one or more light sources; and directing the plurality of light beams to the holographic optical element from the plurality of entrance pupils by at least one mirror.

Example 30

The method of example 29, wherein the at least one light source comprises a plurality of light sources, each of the plurality of light sources to emit a one of the plurality of light beams.

Example 31

The method of example 30, comprising: receiving, at an optical element, light projected by the mirror; and directing, at the optical element, the projected light to the holographic optical element from the plurality of entrance pupils.

Example 32

The method of example 31, the at least one mirror comprises a micro-electromechanical system (MEMS) mirror.

Example 33

The method of example 31, the projection system comprising an optical element in optical communication with the mirror, the mirror to project light onto the optical element and the optical element to direct the projected light to the holographic optical element from the plurality of entrance pupils.

Example 34

The method of example 33, wherein the optical element comprises at least one of a prism, a fold mirror, a beam splitter, a lens, or a wave plate.

The invention claimed is:

1. A system, comprising:
a frame;
a projection surface operably coupled to the frame, the projection surface comprising a holographic optical element; and
a projection system operably coupled to the frame, the projection system to project light from a plurality of entrance pupils to the projection surface, each of the plurality of entrance pupils comprising a first light beam having a first wavelength, a second light beam having a second wavelength, and a third light beam having a third wavelength, wherein the first wavelength is different from the second wavelength and the first and second wavelengths are different from the third wavelength, the holographic optical element to receive the light from the plurality of entrance pupils and reflect at least a portion of the light to a plurality of exit pupils, wherein the plurality of exit pupils comprise a first set of exit pupils corresponding to the first light beam having the first wavelength, a second set of exit pupils corresponding to the second light beam having the second wavelength, and a third set of exit pupils corresponding to the third light beam having the third wavelength.

2. The system of claim 1, wherein the frame is a glasses frame, a helmet frame, or a windshield frame.

3. The system of claim 2, wherein the projection surface is a glasses lens, a helmet visor, or a windshield.

4. The system of claim 1, at least one of the plurality of entrance pupils spatially separated from at least one other of the plurality of entrance pupils in an out of plane direction of the holographic optical element.

5. The system of claim 1, wherein the plurality of exit pupils comprises a spatially separated exit pupil for each light beam of the plurality of entrance pupils having a different wavelength.

6. The system of claim 1, the projection system comprising:
- at least one light source to emit the first, second, and third light beams; and
- at least one mirror in optical communication with the at least one light source, the mirror to receive the first, second, and third light beams and direct the first, second, and third light beams to the holographic optical element from the plurality of entrance pupils.

7. The system of claim 6, the projection system comprising an optical element in optical communication with the mirror, the mirror to project light onto the optical element and the optical element to direct the projected light to the holographic optical element from the plurality of entrance pupils.

8. The system of claim 7, wherein the optical element comprises at least one of a prism, a fold mirror, a beam splitter, a lens, or a wave plate.

9. The system of claim 1, comprising a battery electrically coupled to the projection system.

* * * * *